United States Patent [19]

Krzeszowski

[11] 4,123,305

[45] Oct. 31, 1978

[54] METHOD OF HEATING FOR CONNECTING A PLATE ELEMENT TO A SUPPORT BY MEANS OF A THERMOFUSIBLE GLUE

[75] Inventor: Thaddée Krzeszowski, Lesigny, France

[73] Assignee: Societe Anonyme dite: Weber et Broutin, Seine et Marne, France

[21] Appl. No.: 789,441

[22] Filed: Apr. 20, 1977

[30] Foreign Application Priority Data

Apr. 21, 1976 [FR] France ................ 76 11750

[51] Int. Cl.² ............... B23K 13/02; H05B 5/00; E04B 2/00; B29C 19/02
[52] U.S. Cl. ................... 156/71; 156/272; 219/10.53; 219/10.75
[58] Field of Search ............ 156/71, 272, 309; 219/10.49, 10.53, 10.59, 10.75, 55 R

[56] References Cited

U.S. PATENT DOCUMENTS

| 3,403,240 | 9/1968 | Henderson et al. | 219/10.49 |
| 3,867,226 | 2/1975 | Guido | 156/306 |
| 3,985,604 | 10/1976 | Balla | 156/272 |
| 3,996,402 | 12/1976 | Sindt | 156/272 |
| 4,035,547 | 7/1977 | Heller et al. | 156/272 |

FOREIGN PATENT DOCUMENTS 465,729  1/1969  Switzerland ............ 219/10.79

Primary Examiner—Douglas J. Drummond
Attorney, Agent, or Firm—Shapiro and Shapiro

[57] ABSTRACT

A carpet or like covering is fastened to a floor or like support surface by a sheet comprising a thermo-fusible material interposed between the carpet and floor. A field of vibrations suitable for heating the thermo-fusible material is applied to the exposed face of the carpet and the source is moved over the extent of the sheet.

10 Claims, 10 Drawing Figures

METHOD OF HEATING FOR CONNECTING A PLATE ELEMENT TO A SUPPORT BY MEANS OF A THERMOFUSIBLE GLUE

The invention refers to the technical field of the connection of a thin element in the form of a plate or a sheet to a support of large area.

It relates more particularly to a method of heating which enables a plate element or a sheet to be connected by means of a thermofusible glue to a support without risk of damage to this sheet.

The practice is known of attaching Turkey or Brussels carpet by gluing onto a floor suited to this laying.

But putting this into effect, which is in general ensured by adhesive matter in liquid or paste form implies a certain percentage of solvent at the time of laying, because too small a percentage or an absence of solvent no longer enables this adhesive matter to remain "in a sufficiently good humour" to ensure adhesion between the portions to be connected.

An excessive percentage of solvent hinders this adhesion so that respect for a "gumming time" by evaporation of the solvent, which is variable as a function of the support, of the coating and of the ambient conditions, makes it tricky to put this coating into effect.

Furthermore the solvents at present incorporated into these adhesive substances are often volatile, inflammable and toxic, which introduces multiple risks of fire, explosion and poisoning.

In addition, the laying of a Turkey or Brussels carpet attached by gluing onto a floor cannot be carried out without impairing more or less either the floor or the carpet, which involves restoring the state of the floor and the impossibility of recovering the carpet.

True, in order to avoid disadvantages inherent in applications by conventional gluing it has already been proposed with a view, for example, to the manufacture of woodchip panels covered with a coating plate of plastics matter, to coat the back of this coating plate with a layer of thermofusible glue and then by heating either the plate or the panel to fix them together by gluing and by the action of adequate pressure.

But on site the success of such manufacture would only be able to be ensured by craftsmanship and consequent cost that would be excessive for laying carpet on a floor.

Again, the method of heating necessary to the melting of the thermofusible flue must not present the risk of damage to the carpet.

It has likewise come to be proposed that local fixing of a carpet to a floor be effected by means of a strip consisting of thermofusible glue, if necessary filled with glass fibres but reinforced with a conductive metal lattice for constituting a circuit for heating under the effect of an electric current and thus ensuring melting of the glue.

But if the core of this strip forms a circuit which subsequently enables advantageous laying by melting of the glue, the strip cannot be employed under economic conditions which are acceptable for gluing "in the open" across large areas.

That is, it would be necessary to lay the edges of multiple elements of such a strip side by side in order to cover completely the area of a floor so that its use is limited to fixing here and there (edges or borders) on the carpet.

The purpose of the invention is to correct these disadvantages.

Its essential aim is to ensure the connection of a coating element in the form of a sheet to a support whilst avoiding any possibility of damage to this coating element.

Another aim of the invention is by means of devices and apparatus easy to handle on site to ensure convenient laying especially of carpet on a floor whilst calling in only to a fairly small degree labour without special qualifications.

Another aim of the invention is to ensure between a coating element and a support a connection quite compatible with possible recovery of this element without impairment of the support.

The invention likewise has as its aim avoiding the risks of fire and explosion inherent in adhesive matter employed hitherto for gluing, for example, a carpet to a floor.

Its main object is a method enabling the heating
  through a sheet liable to be impaired by a flow of heat, especially a carpet,
  of a plate arranged facing this sheet, of an area of the order of at least one square decimeter.
Such a method is noteworthy in that — it consists
  of incorporating beforehand into the plate a structure capable of heating up under the effect of a field of vibrations,
  of generating from a source applied to the face of the sheet opposite from the plate and in front of at least one portion of the plate a field of vibrations which is suitable for heating of the structure alone, to the exclusion of the sheet, the said field being sufficiently intense to reach the plate through the sheet,
  of moving the source by degrees over the extent of the plate.

Preferably the field generated by the source is a field of magnetic induction.

Fields of this nature may easily be generated for relatively medium frequencies of vibration and of the order of 30 to 50 kH, such frequencies securing good results.

In addition the plate subjected to the action of such a field is advantageously constituted from a thermofusible glue, this glue exhibiting a melting point the value of which involves no risk of damage to the sheet.

It may be understood that such a method is perfectly suited to the melting of a glue of Hot-Melt type with a view to the connection of a coating element to a support the area of which may be very large.

Thus in order to connect a carpet to a floor it is sufficient to carry out the operations repeated below:
  to arrange in succession on this floor a thermofusible glue, reinforced with a structure sensitive to a field of vibrations, then suitable elements of carpet so as to trap the said layer of glue between the floor and the carpet,
  to generate through the carpet a field capable of bringing this glue to its state for gluing,
  to apply a pressure to the carpet.

It will be understood that cooling of the glue thus melted occurs following upon movement of the field, in order to ensure connection of a coating element to its support and in particular of this carpet to this floor.

The object of the invention is likewise to use a thermofusible glue of Hot-Melt type which is in itself known and is perfectly suited to the connection of a coating element to a support of large area by putting into effect a method such as that described above.

In accordance with the invention elements capable of converting into heat energy provided by a field of vibrations are incorporated into the thermofusible glue which is presented in a form enabling its application in a thin layer.

Such a glue, in accordance with the invention, may therefore be presented in the form of a powder for sprinkling in a thin layer or in the form of a thin sheet; elements which constitute a core for heating the thermofusible glue being incorporated into this layer or into this sheet.

It may be understood that application of the method described above to such layer or sheet may by induction provide sufficient heating of its structure to bring about melting of the glue and consequently connection of a coating element such as a sheet to a support, this method of heating of the glue avoiding any cause of impairment of this coating element.

In a first variant in sheet form the thin metal structure is presented in the form of a lattice or a sheet pierced with holes or not, this structure being coated on both its faces with Hot-Melt glue which forms two pellicular layers exhibiting holes or not.

Obviously this sheet which may be handled and stored is ready for applications to the connection of coating elements to the most diverse supports.

In another variant the heating structure may include particles sensitive to the action of a field of vibrations such as particles of metal or graphite or the like.

Particles of graphite, for example, may in fact be associated with a core of the type of that of the first variant mentioned above but they may equally well be employed alone.

In another variant the sheet for connection, having a Hot-Melt glue base, is integral with the back of a coating element.

It will be understood that such a variant enables executions by coating onto the back of coating elements in the factory, from mixtures of Hot-Melt glue and suitable structures. Hence this variant is well suited to the preparation of elements of carpet or the like with a view to the putting of these elements into use on supports of large area such as a floor.

In addition it is better suited to vertical-wall coatings under conditions as favourable as possible upon site.

In all cases the core of a sheet or powder in accordance with the invention avoids the disadvantages inherent in the current-conductive cores which have been proposed hitherto for the melting of a thermofusible glue.

In addition this glue as a sheet or as powder, thanks to its method of application avoids both in the factory and on site the risks of fire, explosion and poisoning inherent in the glues employed conventionally for the connection of a carpet to a floor.

The invention likewise refers to an apparatus well suited to putting into effect under site conditions a method similar to that described above. Such an apparatus is noteworthy in that it includes on the one hand a frame which is able to be easily moved and handled and is equipped with a circuit capable of generating a field under the action of a suitable supply, and on the other hand a generator device capable of ensuring in known manner a remote feed to the field circuit of this frame by means suited to the ease of handling of the latter, such as flexible conductors.

It may be understood that the area of action of the field to which one portion of the carpet is subjected may exhibit sufficient width for acceptable speed of application of a coating but be sufficiently small to demand only an amount of energy perfectly suited to the use of movable apparatus which can easily be handled on site, this ease of handling bringing about at least cost the efficacy of this putting into effect.

Finally it may be understood that a coating element connected to a support as described above may easily be subjected to the action of an apparatus similar to that employed for laying it, with a view to being un-laid without damage either to itself or to its support and thus to being recovered.

Other characteristics and advantages of the invention will emerge from the description which follows in respect of the attached drawings, which description and drawings are given only by way of non-restrictive example.

In these drawings

FIG. 1 represents in plan and partly cut away a sheet for connection by gluing in accordance with the invention, FIG. 2 represents in transverse section to a considerably larger scale one portion of the sheet as FIG. 1, FIG. 3 shows a perspective on a relatively small scale an apparatus standing on a floor covered with a carpet, this apparatus enabling this carpet to be connected to this floor thanks to sheets similar to those as FIG. 1, FIGS. 4a to 4c are diagrams enabling it to be explained how the carpet of FIG. 3 may be connected to its floor, FIG. 5 shows in section, partly cut away and on a large scale a carpet the back of which is lined with a variant upon the sheet of FIG. 1.

Figure 1:
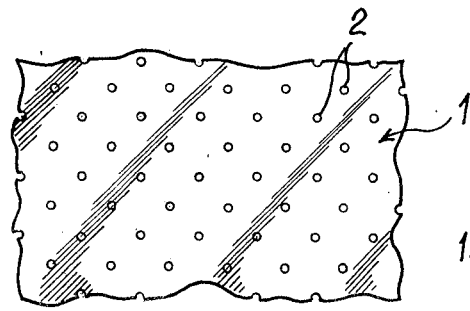

In FIG. 1 may be seen a sheet 1 exhibiting holes 2 which are located at the intersections of a chequerwork formed conventionally by two sets of parallel straight lines; in this example the diameters of the holes 2 may be of the order of 2 to 5 mm and the pitch between the intersections of the chequerwork of the order of 7 to 15 mm.

Figure 2:
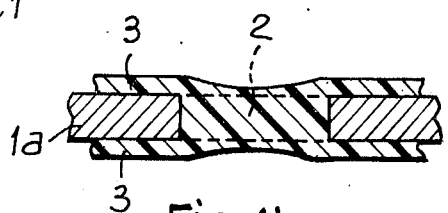

It is to be clearly stated that this sheet has a very thin "heart" 1a of aluminium (FIG. 2), the thickness of which may be of the order of some hundredths of a millimeter and it will be observed that each of the two faces of this heart 1a is coated with a pellicular layer 3 having a base of a glue to which reference will be made again later. However, it may be pointed out that this glue is of a type commonly called Hot-Melt, which melts under the action of heat at a temperature lying between 60° and 120° C., such glues being employed in known manner for various applications by hot gluing, especially the connection in the factory of coating elements appearing in the form of sheets, foils or plates on suitable supports, in particular panels of various natures. On this subject it may be observed that the melting point of glues of this nature is not prejudicial to the good quality of coating elements currently employed and in particular carpet.

It is to be clearly stated that this sheet 1 may be produced without any particular difficulty by hot application of processes currently employed in the technical field of coating by means of conventional devices and machines.

Hence it may be understood that such a sheet 1 may be delivered in the form either of strips of greath length, packaged in rolls or in rectangular sheets the dimensions of the sides of which are of the order of a meter, these sheets being suitably stacked on one another.

Figure 3:
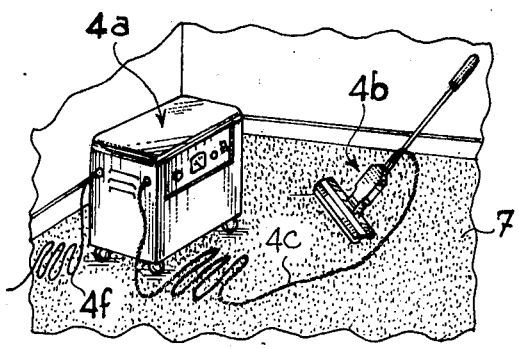

Furthermore in FIG. 3 may be seen an apparatus consisting mainly of a cabinet 4a the dimensions (height, length, width) of which lie between about 2 to 6 decimeters, and of a "shoe" 4b equipped with a handle, this shoe 4b being connected to the cabinet 4a by a flexible cable 4c including wires for conducting the electricity.

This apparatus which will be described in greater detail later, comprises a "generator" arranged inside the cabinet 4a and capable of being fed from a conventional distribution network of electrical energy of 50 Hertz, thanks to a conductor cable 4f for supplying alternating current at high frequency with a view to exciting an "oscillating circuit" which equips the shoe 4b (FIG. 6), this circuit including capacitors 5c and an induction coil 5s capable of generating a field of electromagnetic induction at "medium frequency."

It will be observed that this apparatus is standing on a covering of cement 6 covered, for example, with a carpet 7 which may be connected to this covering or floor by a "continuous gluing" as is explained below, the cabinet 4a being provided with two feet and two wheels for moving it.

After having suitably "prepared" this floor by, for example, trimming up with a smoothing coat in conventional fashion, sheets 1b identical with the sheet 1 described above are spread over it, taking care to arrange them approximately edge to edge so as to cover the whole area of this floor (FIG. 4a), these sheets 1b in this example being delivered in rolls. Then in a conventional fashion widths of carpet 7a are spread over this floor lined with sheets 1b, by arranging these widths edge to edge (FIG. 4b).

It is then sufficient (FIG. 4c) to set the generator of the apparatus 4a working and then at a suitable speed (arrow $f_1$, FIG. 4c) to move the shoe 4b over the carpet to ensure connection of it to the floor.

That is, during the course of this movement the field of induction at raised high frequency provided by the induction coil 5s passes through the carpet 7 and induces in the portion of the heart 1a subjected to this field "eddy currents" which may be sufficiently intense to ensure by heating of this portion of the heart 1a, melting of the glue in the corresponding portions of the layers 3, and the speed of movement of the shoe 4b may be such that an induction coil 5s of length 3 to 4 decimeters sweeps approximately 1 $m^2$ of carpet per minute.

It is sufficient in addition, for this shoe 4b to be suitably loaded so that the pressure applied to the carpet by two skids with which this shoe is equipped transversely, brings about by degrees the hot gluing of this carpet 7 onto the hearts 1a and simultaneously the gluing of these hearts 1a onto the platform 6.

A load of 10 to 20 kg on two skids of a total sliding area of about 150 $cm^2$ provides good results and connection of the carpet 7 to the floor 6 occurs upon cooling, which is quick, of the glue in the layers 3.

The foregoing description enables it to be understood that the field of induction produced at high frequency by the induction coil 5s of the shoe 5 located on one side of the carpet passes through this carpet without risk of damage, in order to reach on the other side the heart 1a which constitutes in that way a structure which is remarkably effective for converting into heat the energy provided by the field from this induction coil 5s, the small thickness of this sheet 1a being contrary to dissipation of the heat generated, in spite of the good conductivity of the aluminium.

It will be observed that this method applied here to the melting of the glue might be employed for the heating of elements such as a plate every time that contingencies of arrangement impose interposition of other elements such as the above sheet, the nature of which is incompatible with a flow of heat, whatever be the method of transmission of this heat: radiation, conductivity or flow of fluid, for example, hot gas.

It may be understood that the holes 2 in the sheets 1 are sufficiently small for the heat generated in the sheet 1 to ensure melting of the glue in the lenses formed in these holes 2, thus enabling at right angles to the latter, direct gluing of the carpet 7 to the floor 6.

Figure 6:
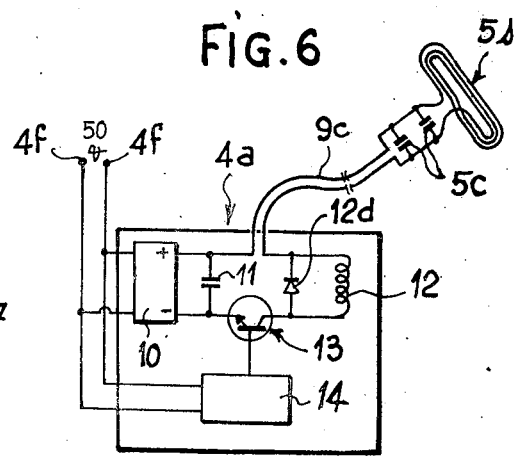
FIG. 6 shows diagrammatically the circuits of the apparatus of FIG. 3.
Figure 7:
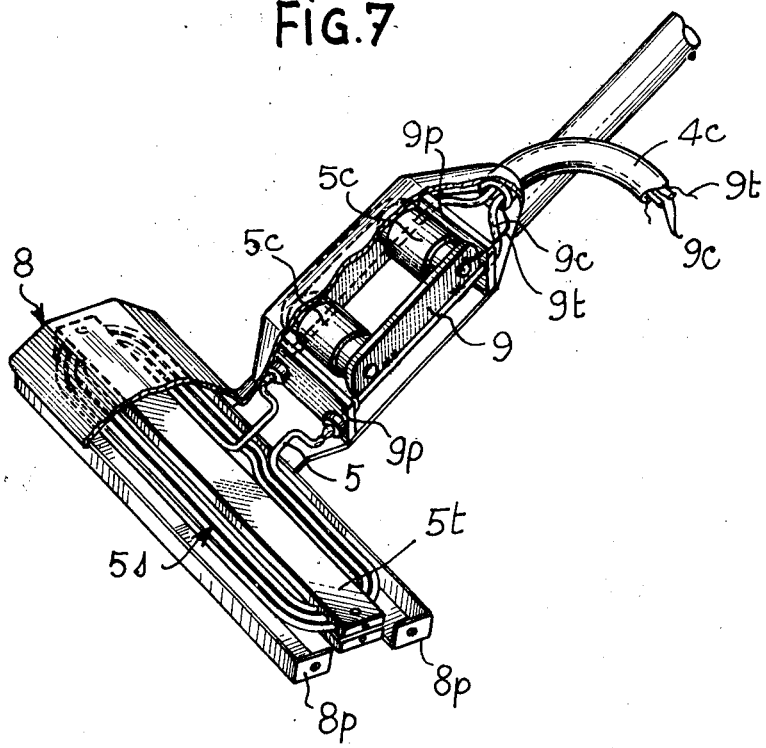
FIGS. 7 and 8 show respectively in perspective and in plan the essential elements of one portion of the apparatus of FIG. 3.
Figure 8:
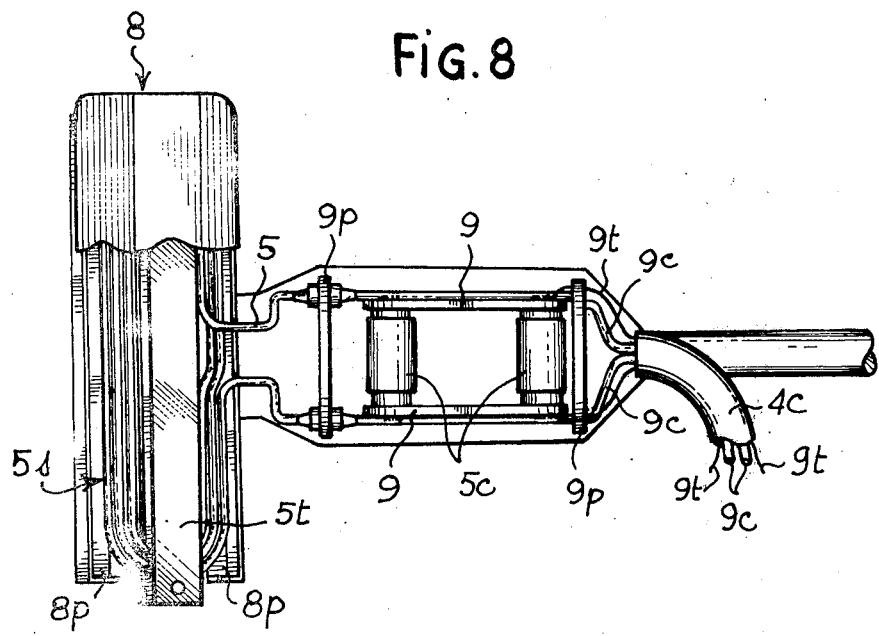

A variant upon the sheet as FIG. 1 (having a base of a sheet 1a of aluminium not exhibiting holes 2) enables advantageous manufacture of composite products such as panels including a heart impervious to moisture and commonly called "vapour-barrier," a sheet of this kind having two adhesive faces being well suited to industrial series manufacture in the factory by means of a generator of "HF"/current which may be substantially simpler than that of FIGS. 6 to 8 because of the static state of its self-induction.

In fact a sheet of aluminium constitutes conventionally an excellent barrier to moisture if it does not exhibit the slightest hole (even of the order of one thousandth of a millimeter) and, for example, for the technical field of building, composite panels have been proposed which include such a sheet caught in a sandwich between a plaster-base slab and a slab of expanded polystyrene.

Now, in order to manufacture such panels industrially a vapour barrier sheet of aluminium is first of all glued by one of its faces onto a slab of plaster and then connected by its other face to a slab of expanded polystyrene. But this aluminium sheet must be thin in order not to be too costly, so that the precautions taken during the course of handling and conveyance in order to pass from the first gluing operation to the second do not avoid perforations of this vapour-barrier, which reduces or wipes out its sealing effect.

Hence it may be understood that a sheet of luminium coated with Hot-Melt glue on both faces (which would be possible on a sheet of thickness 1mm if it were not too costly) can avoid these disadvantages because:

1. — the layers of glue 3 ensure a protection which is not negligible to a thin sheet of aluminium,
2. — this sheet enables a single operation of connection of the slab of plaster to the slab of polystyrene, which avoids the operations of handling and transfer during the course of which a sheet 1 may be accidentally punctured.

This connection in a single operation is obviously less costly than conventional connection, as the natures of the two layers of glue may without particular difficulty be suited to the respective natures of the aluminium and the elements to be connected, for example, plaster and polystyrene.

Again, it may be understood that this "heater core" 1a of the glue exhibits sufficient mechanical strength to constitute secondarily a support for the pellicular layers of glue 3, which facilitates the manufacture, handling, storage, conveyance and putting into effect of these connection sheets. Hence a sheet 1 of this kind is perfectly compatible with the most diverse coating applications but in certain cases the operations of lining a floor with sheets 1b may be avoided by attaching such sheets by heat in the factory to the back of the widths of carpet 7, for example, with a view to connecting them to different supports.

Such a variant is well suited to the connection on site of coating elements to a vertical wall.

Figure 5:
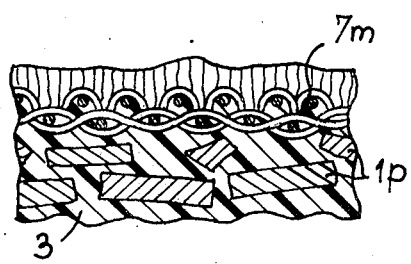

Furthermore for similar cases where a coating element may be lined in the factory with its gluing sheet, good results of connection have been obtained by producing in the factory by coating onto the back of these coating elements (for example, widths of carpet 7m) a sheet having a base of a mixture of Hot-Melt glue and thin particles of aluminium 1p (FIG. 5), the proportion of the latter in this mixture being suited to the formation of a core providing heating results similar to those mentioned above.

Satisfactory results have likewise been obtained with connection sheets thus carried by a coating from mixtures in suitable proportions of Hot-Melt glue and graphite powder exhibiting a grain size adequate for the satisfactory formation of a heater core.

True, it is possible to manufacture industrially from a mixture of Hot-Melt glue and ad hoc particles (aluminium, graphite) a flexible sheet in the form of strip by means of calendering machines usually employed for the manufacture of sheets of plastics such as sheets of polyethylene, for example.

Such sheets would enable applications similar to those of the sheet 1 as FIG. 1, but they would be less advantageous than those integral with coating elements, especially because of the small thickness that the latter can exhibit, since tests have confirmed that satisfactory gluing is obtained for amounts of glue not exceeding 100 to 400 grammes per $m^2$ distributed over the two faces of a heater structure.

Figure 4A:
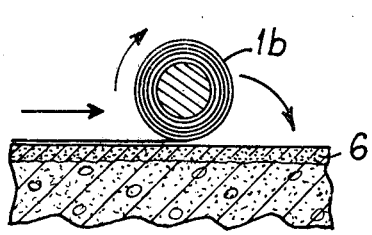
Figure 4B:
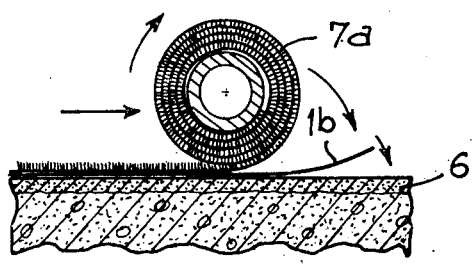
Figure 4C:
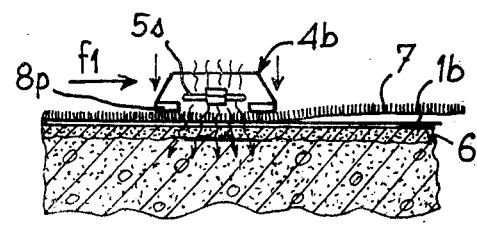

It may be understood that it is therefore remarkably advantageous to produce variants having a base of particles, of the connection sheet by direct coating onto the back of a coating sheet or similar element, because upon the good economical conditions which such putting into effect in the factory provides, is superimposed, in fact, appreciable conveniences of handling, conveyance and storage of this composite product ready for laying and avoiding furthermore the operation of lining a support already mentioned concerning FIG. 4a.

Obviously for sheets or coating elements offering sales compatible with a stock available in store of this composite product, all the other possible embodiments of the connection sheet may equally well be so attached in the factory to their coating element in order to provide the advantages already mentioned, even the variant of FIG. 1, although the heater core provided in this variant constitutes a good support to the two skins of glue 3.

Finally it is possible and it may be advantageous
  to prepare in the general form of a powder a suitable mixture of Hot-Melt glue in the ground state and of heater particles,
  to spread this mixture over a floor, for example, by sprinkling to form a thin layer,
  to spread carpet elements over this layer and then to operate as has been explained above concerning FIG. 4c for connecting this carpet to the floor.

One might equally well employ in the same way as granules, thin particles coated with a skin of Hot-Melt in order to obtain a similar result.

This way of proceeding enables various contingencies proper to work on a site to be satisfied, for example, unforseen replacements or adjustments of certain portions of coating on a support.

In all cases for all these variants upon the cores (sheets, lattice or network, particles of metal or graphite . . . ) and coating elements applied to floors or other supports of large area (walls, building partitions . . . ) it may be understood that the convenience of an application of coating onto an area which may be very large is essentially due to the ease of handling of the shoe 5, as the "supply generator," being relatively bulky, may be "relegated" successively to portions of floor suitable for free manoeuvres of this shoe 5.

This shoe 5 in fact only comprises elements which are not very bulky (induction coil and capacitors), which allows of very diverse manoevures both over a floor and over vertical walls such as walls or partitions, as the handle of this shoe may be replaced by one or two handholds suitable for such types of application.

Finally it may be understood that the action of the field from the shoe through carpets being connected to a floor as has been described above will have the effect of a heating of the core 1a, which is idential with that mentioned above and consequently sufficient to bring about melting of the glue with a view to carrying out progressively by degrees "unlaying" of this carpet without damage either to the latter or to its support.

True, operations which are the reverse of operations of connection or erection of the most varied elements have always enabled dismounting the latter but these dismountings are often more costly than the corresponding erection and it is well to observe that the efficacy of the shoe 4b enables here un-laying which is at least as quick and advantageous as an equivalent laying of a coating.

Furthermore the shoe 4b (FIGS. 7 and 8) includes a frame 8 in the form of a case the bottom of which is integral with two straight profiled elements 8p of insulating and heat-resistant matter, for example, having a base of fibres and synthetic resin or urea formaldehyde type.

These two elements 8p length of which is of the order of 30 to 50 cm are suitably attached underneath the bottom of this case 8, being arranged in parallel and leaving between them a gap of about 10 to 15 cm in order to constitute for this shoe 4b the skids mentioned above.

A unit of three plane rectangular turns resulting from bending at right angles a tube 5 of pure copper of about 6 mm diameter to constitute an induction coil 5s is attached thanks to crosspieces of insulating material 5t to the lower portion of the case 8, being arranged in a plane parallel with the plane predetermined by the faces of slide of the skids 8p at a distance of the order of 1 cm from this plane.

On this subject it is to be made clear that known means (not shown) may be provided on the case 8 in order to ensure in an adjustable fashion the relative positions of the skids 8p and the induction coil 5s; this enables the aforesaid distance to be adjusted as a function of the thickness and the nature of the coating elements being put to use.

The ends of the tube 5 are connected in a dismountable fashion to other tubes welded to bars 9 arranged in parallel with one another in order to enable the mounting of the connection terminals of two capacitors 5c; these tubes may be connected to rubber pipes 9t in order to constitute a conventional cooling circuit by a flow of water. The bars 9 are attached to the case 8 by crossbars or feet of insulating material 9p and are connected by flexible conductor wires 9c to the aforesaid circuit from the cabinet 4a.

In this cabinet 4a (FIG. 6) are in fact fixed and mounted in the usual way:
- a source of continuous current 10 connected by conductor wires 4f to a conventional alternating current network at 50 Hz. This source is shunted by a decoupling capacitor 11 for feeding in series:
    an induction coil 12, shunted by a diode 12d,
    a switching device 13 (for example, a transistor) for supplying a "chopped current",
- a pilot device 14 intended for receiving information for controlling the operation of the device 13 suitably.

This circuit can supply to the oscillating circuit 5c, 5s of the shoe a current of, for example, an effective intensity of 30 amperes at a crest voltage of 120 volts at a frequency of 30 kHz, the induction coil 5s having three turns of a length of about 40 to 50 cm and a width of about 10 cm.

The source 10 is fed at a voltage of about 70 volts at 50 Hz, for example, thanks to an "explosionproof" transformer (not shown) which may be independent of the cabinet 4a for ease of movement of the latter.

It may be understood that the rubber tubes 9c of the water cooling circuit and the conductor wires 9c may be grouped together to form a flexible cable 4c and it may be understood that the current flowing in the conductors of this cable enables remote feeding of the heater shoe 4b without danger to a user, the inevitable energy losses being from the very fact of the nature of the circuit of the cabinet 4a, still acceptable for lengths of 15 to 20 meters of this cable.

Finally, concerning the glue in the layer 3, it may be pointed out that conventional operations (grinding, screening, mixing . . . ) applied to the amounts of products specified in the tables below have provided satisfactory results.

A-

| PRODUCTS | Known under the BRAND | Amount in kg |
|---|---|---|
| Ethylene vinyl acetate | Ultrathese USI 61 204 | 35 |
| Microcrystalline wax | Victory Amber | 18 |
| Colophenyl | Sicasso | 35 |
| apinene resin | Dercolyte A 10 | 7 |
| Silica | Latexyl S | 5 |

This "glue" has been applied by hot coating (90° to 100° C.) to:
(a) — Aluminium sheet (ALBAL brand, reference 623 — perforated with holes 5mm in diameter at the rate of 30% of the area).
(b) — Steel wire gauze: 1mm mesh, wire 0.3 mm in diameter,
(c) — Aluminium sheet (ALBAL brand, reference 623. without perforations),
weight of glue employed 300 to 400 gr/m².

B — To the mixture of the five products specified above there may be added:
(d) — Discs of 5mm diameter of aluminium or "confetti" (resulting from the perforation of sheets, specified under a)) — 20 to 30 kg or else
(e) — Graphite powder exhibiting a "grain size" lying between 90 and 110. 1/1000 mm 30 kg.

These mixtures d), e) have been applied hot (temperature lying between 90° and 100° C.) to the backs of carpet elements at the rate of 400 gr/m².

I claim:

1. A method of fixing a covering sheet to a surface of a support having a surface area at least as large as the covering sheet, comprising spreading over an entire area of the surface of said support substantially equal to the area of the covering sheet a layer including hot melt glue and a material capable of being heated in response to an induction field of vibrations, arranging the covering sheet on the layer so as to sandwich the layer between the support and the covering sheet, generating through the covering sheet an induction field of vibrations having an area of at least one square decimeter and substantially less than the area of the covering sheet, and displacing said field over the entire covering sheet to cause the entire covering sheet to be evenly glued to the support.

2. A method in accordance with claim 1, wherein the layer is formed integral with and coextensive with the covering sheet and the layer and covering sheet are applied to the support at the same time.

3. A method in accordance with claim 1, wherein the layer is formed by sprinkling over the surface of the support a hot melt glue powder containing elements of said material that are heated by an induction field.

4. A method in accordance with claim 1, wherein the layer is formed by at least one sheet of material that is heated by an induction field and that is coated with said hot melt glue.

5. A method in accordance with claim 4, wherein the material is aluminum.

6. A method in accordance with claim 1, wherein the field is generated by an induction coil supported on a shoe that is moved over the covering sheet.

7. A method in accordance with claim 6, wherein pressure is applied to the covering sheet by pressing the shoe onto the covering sheet as it is moved over the covering sheet.

8. A method in accordance with claim 1, wherein the support is a floor or wall of a building and the covering sheet is carpeting.

9. A method in accordance with claim 2, wherein the support is a floor or wall of a building and the covering sheet is carpeting.

10. A method in accordance with claim 3, wherein the support is a floor or wall of a building and the covering sheet is carpeting.

* * * * *